Nov. 20, 1928.
A. FRIEDMAN
RELIEF VALVE
Filed Sept. 30, 1924
1,692,773
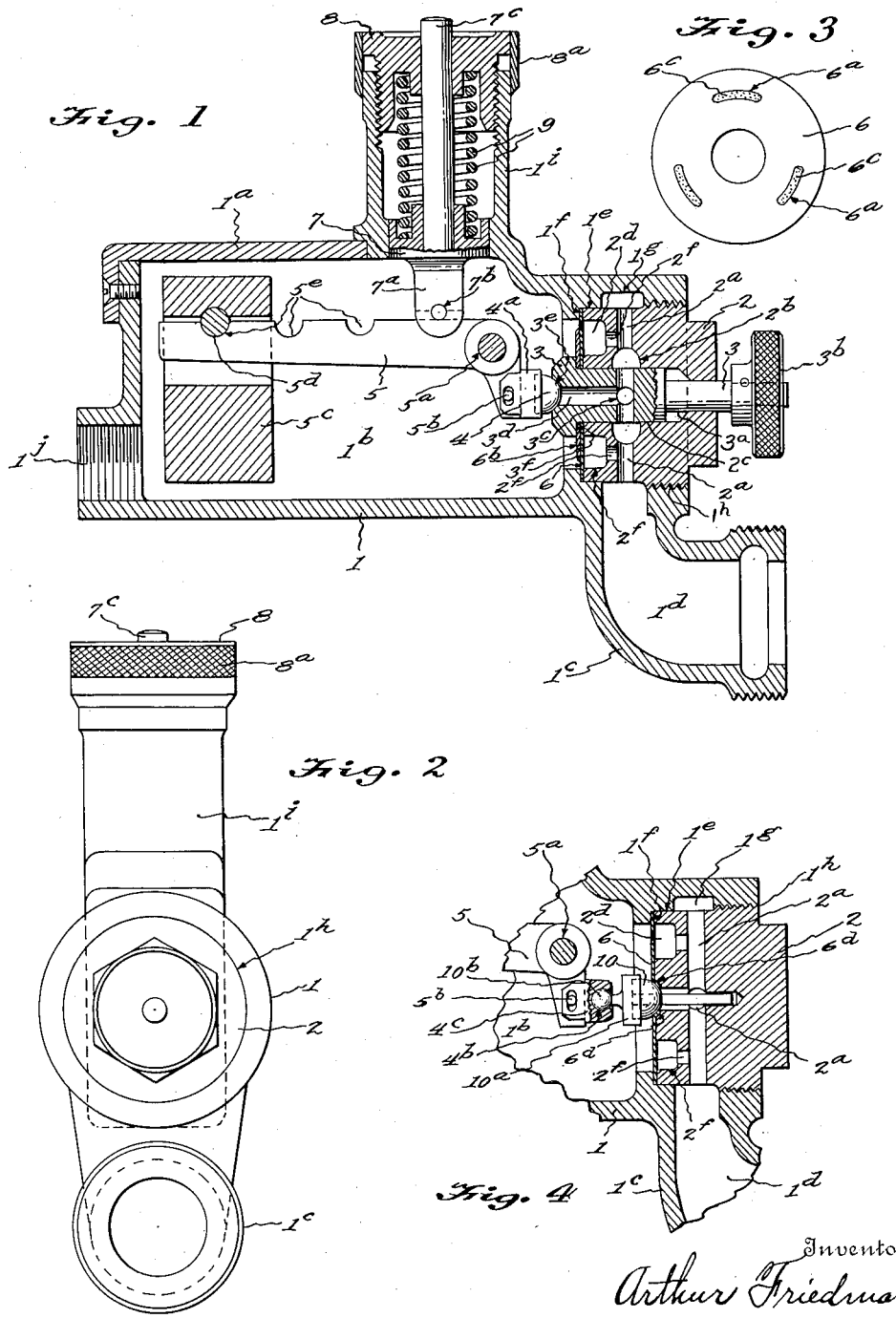

Patented Nov. 20, 1928.

UNITED STATES PATENT OFFICE.

ARTHUR FRIEDMAN, OF CLEVELAND, OHIO, ASSIGNOR TO THE CLEVELAND HEATER COMPANY, OF CLEVELAND, OHIO, A CORPORATION OF OHIO.

RELIEF VALVE.

Application filed September 30, 1924. Serial No 740,749.

This invention relates to improvements in relief valves, and more particularly to that class or type in which the sensitiveness of the relief or control valve is adapted to be regulated to meet varying pressures or conditions through the medium of adjustable lever and spring resisted plunger mechanism.

The present embodiment of the invention is particularly designed and adapted for use as a relief valve in connection with automatic storage systems, such as hot water systems, and the like, the improved valve being provided with a pressure and temperature responsive diaphragm provided with fusible material communicating with suitable auxiliary ports and adapted to operate when predetermined pressures or temperatures are reached and independently of the main or relief valve,—particularly in the event that such main or relief valve has become inoperative through a disarrangement or sticking of the valve parts through corrosion or other sealing or deteriorating agents.

The primary object of the invention is to provide a generally improved relief valve of the type or class indicated, which will be exceedingly simple in construction, cheap of manufacture, and efficient in use.

A further and very important object is the provision of an improved rotatably mounted valve seat member provided with a main relief port having exterior rotating or operating means whereby the contacting surfaces of the valve and valve seat may be kept in condition or the parts may be reseated without removal or disassemblage of the parts for such purpose.

A still further and important object is the provision of an improved form and arrangement of removable port head carrying the rotatable valve seat forming member and the auxiliary ports, together with the pressure and temperature responsive diaphragm adapted to come into use as a safety or emergency device, as above referred to.

With the above mentioned and other ends in view, the invention consists in the novel construction, arrangement and combination of parts hereinafter described, illustrated in some of its embodiments in the accompanying drawings, and particularly pointed out in the appended claims.

Referring to the drawings, forming a part of this specification, Figure 1 is a central longitudinal sectional view of a relief valve, constructed in accordance with this invention.

Fig. 2, a view of the rear or valved inlet portion of the same.

Fig. 3, a plan or face view of the pressure and temperature responsive diaphragm, detached, and illustrating in particular the fusible material carrying ports or openings therein.

Fig. 4, a fragmentary longitudinal central sectional view of a modified form of port head and valve seat.

Similar numerals of reference designate like parts throughout all the figures of the drawings.

The improved relief valve comprises a valve housing 1, which may be of any suitable and convenient form, said valve housing, in the present instance, being provided with a removable section 1ª, for affording access to the counterbalanced lever and the adjustable weight carried thereby located within the chamber or compartment 1ᵇ. The valve housing 1 is provided with an inlet connection 1ᶜ, for convenient connection with the pipe or tank of the system in which it is installed. In the present instance, the connection 1ᶜ is in the specific form of an integral elbow pipe affording an inlet passage 1ᵈ, and the rear portion of the housing is provided with an opening 1ᵉ, to receive and carry the removable port head, hereinafter referred to. The opening 1ᵉ is provided with an annular shoulder 1ᶠ, to co-act with the face side of the removable port head in holding the diaphragm, hereinafter described.

The head receiving opening 1ᵉ is also preferably provided with an annular groove or recess 1ᵍ, and a threaded portion 1ʰ.

The valve housing 1 is also provided, in the present instance, with a cylindrical upwardly extending housing or extension 1ⁱ, for the reception of the spring controlled adjustable plunger mechanism, hereinafter referred to.

The port head 2 is removably and adjustably mounted in the opening 1ᵉ through the medium of exterior threads meshing with the threaded portion 1ʰ and is provided with a plurality of radial ports 2ª, communicating with the inlet connection of the valve housing and the annular recess or passage 1ᵍ. The radial ports 2ª terminate in an annular groove or recess 2ᵇ, surrounding a cylindrical opening 2ᶜ, adapted to removably receive and carry the rotatable valve seat member 3.

The rotatable valve seat forming member 3 is provided with a reduced stem portion 3ᵃ, extending through the rear portion of the removable port head and provided with a rotatable knob 3ᵇ. The valve seat member 3 is also provided with radial ports 3ᶜ, communicating with the annular recess 2ᵇ or intermediate feeding chamber, and said valve seat forming member is also provided with a main longitudinally extending relief port 3ᵈ, the latter terminating in an annular valve seat 3ᵉ, upon which the valve 4 is adapted to be seated to normally close the main port 3ᵈ. The main valve 4 is adapted to be controlled through a fulcrum lever 5, pivoted at 5ᵃ, on a pivot member, the valve 4 being preferably of glass or other vitreous or non-corrosive material and being mounted, in the present instance, in a valve carrying block 4ᵃ, having side lugs provided with slots loosely mounted on the ends of a cross pin 5ᵇ, of the short arm of the lever 5.

The inner end of the valve seat forming member 3 is preferably enlarged, as shown, affording a shoulder 3ᶠ, adapted to co-act with the inner face of the port head in clamping a pressure and temperature responsive diaphragm 6, provided with fusible material carrying openings or slots 6ᵃ, in direct communication with an annular pressure chamber 2ᵈ, formed by means of an annular recess in the face side of the port head 2. The annular chamber 2ᵈ which is closed by the diaphragm 6 communicates with the inlet port portions of the valve through the medium of a series of horizontal auxiliary ports 2ᶠ intersecting the series of radial ports 2ᵃ. The outer periphery of the diaphragm is engaged between the adjacent shoulder 1ᶠ of the valve housing and the inner face side of the port head to be clamped by the latter, and if desired, the inner face side of the diaphragm may be additionally secured or clamped by means of a washer plate 6ᵇ.

Should the adjustable lever and spring resisted plunger mechanism, or the valve 4 controlled thereby, fail to operate in a normal manner, thereby raising the pressure beyond the desired amount, or should the temperature raise to a dangerous point, the fusible material 6ᶜ (see Fig. 3) will melt out through the temperature occasioned, or under pressure the pressure responsive diaphragm will become ruptured as a safety device to relieve the dangerous pressure or temperature reached.

The lever 5, may be regulated and counter-balanced by means of a counterbalancing weight 5ᶜ, having a cross pin 5ᵈ, adapted to be seated in recesses 5ᵉ designating, in the present instance, a pressure resistance of 70, 100 and 130 pounds, respectively, before the valve 4 will open and unmodified by the spring resisted adjustable plunger mechanism, hereinafter referred to.

If desired, the sensitiveness of the lever controlled valve may be further modified or regulated by means of a vertically movable plunger 7, operating in the cylindrical housing 1ⁱ, and having arms 7ᵃ straddling the main or fulcrum lever 5, the arms 7ᵃ, in the present instance, being provided with a cross pin 7ᵇ, for contacting with the said fulcrum lever. The plunger 7 is provided with a pin 7ᶜ, extending upwardly as a guide pin and, in the present instance, extending through an adjusting cap 8, threaded within the top portion of the housing 1ⁱ and adapted to regulate the tension or sensitiveness of the coiled expansion spring 9, interposed between the underside of the cap and the plunger head. The adjusting cap 8 may be provided with a rim or ring 8ᵃ, extending over the top of the housing and provided, if desired, with graduations on its exterior for indicating the relative pressure exerted upon the valve 4 through the lever and the predetermined pressure required to move the valve to a relieving position.

It will be apparent that when the valve 4 is moved to an opening or relieving position, or when the safety or auxiliary pressure and temperature responsive diaphragm is ruptured or opened, the relieved fluid may then pass out through the outlet opening or passage 1ʲ, at the end of the valve housing and such connecting pipe or conduit as may be provided for such purpose.

In the form shown in Fig. 4 of the drawings the port head 2 is slightly modified by dispensing with the opening 2ᶜ, for the reception of the valve seat member 3, and the latter is also dispensed with. In this instance, the pressure and temperature responsive diaphragm 6, is extended and, in the present instance, is provided with an annular portion 6ᵈ, forming the valve seat for the valve 10. In this instance, the valve 10 is mounted in a block 10ᵃ, terminating in a stem having a ball shaped coupling 10ᵇ. The coupling member 10ᵇ may be mounted in a socket 4ᵇ of a block 4ᶜ similar in form to the block 4ᵃ, shown in Fig. 1, and secured in a similar manner by the cross pin 5ᵇ. In this instance also it will be seen that the washer member 6ᵇ of Fig. 1 is dispensed with and the inner portion of the diaphragm is secured directly by the valve 10 instead of the rotatably mounted valve seat member 3, as shown in said Fig. 1 of the drawings.

Having thus described some of the embodiments of my invention, without having attemped to set forth all the forms in which it may be made, or all the modes of its use, what I claim and desire to secure by Letters Patent is,—

1. In a device of the character described, a valve housing, a head provided with main port and branch ports, the latter terminating in an annular recess on the face side of said head, and a removable and replaceable thermostatic member comprising a diaphragm having openings sealed with a fusible material normally closing said annular recess and branch ports.

2. In a device of the character described, a valve housing, a port head provided with a main valve port and communicating branch ports terminating in an annular chamber on the face side of said port head, and a pressure and temperature responsive diaphragm normally closing said annular chamber and branch ports and operable independently of said main valve port.

3. In a device of the character described, a valve body provided with a port head and an inlet connection, a rotatable valve seat provided with a main and branch ports communicating with said inlet connection, a closure of fusible material for said branch ports of said port head, a valve normally closing said main port and seated on said rotatable valve seat, and adjustable lever mechanism for controlling said valve.

4. In a device of the character described, a valve housing provided with inlet and outlet passages, a port head provided with a main valve port and radial ports communicating with said inlet passage, said port head being also provided on its face side with an annular chamber communicating with said radial ports, a pressure and temperature responsive diaphragm normally closing said annular chamber, a valve controlling said main valve port, and adjustable control mechanism for regulating the sensitiveness of said valve.

5. In a device of the character described, a valve housing provided with inlet and outlet passages, a port head removably mounted therein and communicating with said inlet passage and including radial ports and a communicating main valve port, said port head having an annular groove on its face side communicating with said radial ports, a diaphragm closing said annular groove and radial ports, a valve controlling said main valve port, and counterbalanced lever and plunger mechanism for regulating the sensitiveness of said valve.

6. In a device of the character described, a valve body provided at one end with a removable port head and an inlet connection communicating therewith, a rotatable valve seat member in said head provided with a main inlet port and radial ports communicating with said main inlet port, a diaphragm normally closing said radial ports of said removable port head and provided with fusible material, a valve normally closing said main port and seated on said rotatable valve seat member, a fulcrum lever in said valve casing controlling said valve, and an adjustable spring resisted plunger for controlling the sensitiveness of said fulcrum lever and valve.

7. In a pressure and temperature responsive relief valve, a valve housing including inlet and outlet passages at opposite ends, a port head having a central valve port and radial ports communicating with said inlet passage, said port head being provided with an annular chamber on its face side communicating with said radial ports, a diaphragm closing said chamber and separating the latter and said radial ports from the interior of said valve housing and provided with fusible material and adapted to respond to predetermined temperatures and pressures, a valve normally closing said central port, and adjustable control mechanism in said valve housing for adjusting the operation of said valve.

8. In a device of the character described, a valve housing including an inlet passage and an outlet passage, a port head including radial ports communicating with said inlet passage and provided with a central opening and an annular recess, said port head being provided on its face with a second annular recess, a rotatable valve seat member in said central opening provided with radial ports communicating with said first annular recess and a central longitudinally extending port, a diaphragm closing said second annular recess forming an annular chamber in communication with said radial ports of said port head, a counter weighted lever in said valve housing provided with a valve normally closing said main port and seated on said rotatable valve seat member, and an adjustable spring resisted plunger in cooperative relation to said counterbalanced lever for regulating the sensitiveness of the latter and said valve.

9. A relief valve structure comprising a valve casing, a valve seat rotatably secured within the casing, a fluid pressure responsive valve head adapted to cooperate with said valve seat, pressure responsive valve gear adapted to normally maintain said valve head in closed position on said valve seat, and means extending outside of the casing by means of which the valve seat may be rotated relative to the valve head and in contacting engagement therewith.

10. A relief valve structure comprising a valve casing, a valve seat removably mounted therein, a fluid pressure responsive valve head, pressure responsive valve gear adapted to maintain the valve head and seat in valve closing relation, and manually operated means extending outside of the valve casing for rotating the valve seat relative to the valve head and in contact therewith while the valve structure is assembled and operatively connected.

11. A relief valve structure comprising a valve casing, a valve seating member, a fluid pressure responsive valve head member, a pressure responsive valve gear adapted to maintain said members in valve closing relation, and means extending outside of the valve casing for rotating one of said members relative to and in contact with the other of said members.

12. A relief valve structure comprising a casing of substantially tubular form having an inlet port, an outlet port, and an opening in one end theerof, and a port head, a valve block in said opening and adapted to constitute a closure therefor, a valve head adapted to be subjected to fluid pressure and responsive thereto, valve gear carried by said casing and adapted to control the operation of said valve head and a valve seat carried by said valve block, said valve block being removable from the outside of said casing without disturbing the valve gear and manually operable means whereby said valve seat may be rotated in contact with and relative to said valve head.

13. A relief valve structure comprising a metallic valve seat, a pressure controlled valve head of vitreous material adapted to be opened by fluid pressure, and means controlled externally of the valve casing for manually rotating the valve seat relative to the valve head with said seat and said head in contact with each other.

In testimony whereof I have affixed my signature.

ARTHUR FRIEDMAN.